US011138872B2

(12) United States Patent
Tijink

(10) Patent No.: US 11,138,872 B2
(45) Date of Patent: *Oct. 5, 2021

(54) SERVICE STATION FOR AN INTELLIGENT TRANSPORTATION SYSTEM

(71) Applicant: Kapsch TrafficCom AG, Vienna (AT)

(72) Inventor: Jasja Tijink, Breitenfurt (AT)

(73) Assignee: Kapsch TrafficCom AG, Vienna (AT)

(*) Notice: Subject to any disclaimer, the term of this patent is extended or adjusted under 35 U.S.C. 154(b) by 0 days.

This patent is subject to a terminal disclaimer.

(21) Appl. No.: 16/928,612

(22) Filed: Jul. 14, 2020

(65) Prior Publication Data

US 2021/0020035 A1 Jan. 21, 2021

(30) Foreign Application Priority Data

Jul. 17, 2019 (EP) .................................. 19186790

(51) Int. Cl.
*G08G 1/01* (2006.01)
*G06F 16/22* (2019.01)
(Continued)

(52) U.S. Cl.
CPC ....... *G08G 1/0141* (2013.01); *G06F 16/2282* (2019.01); *G06Q 50/30* (2013.01);
(Continued)

(58) Field of Classification Search
CPC .... G08G 1/0141; G08G 1/0116; G08G 1/052; G08G 1/056; G06F 16/2282; G06Q 50/30
(Continued)

(56) References Cited

U.S. PATENT DOCUMENTS

2018/0365909 A1* 12/2018 Cheng .................... G07C 5/008
2019/0051151 A1* 2/2019 Mueck ................. G08G 1/0145
(Continued)

FOREIGN PATENT DOCUMENTS

EP 3462754 A1 * 4/2019 ............ H04L 67/12
EP 3462754 A1 4/2019

OTHER PUBLICATIONS

Extended European Search Report received for European Patent Application No. 19186790.2, dated Jan. 8, 2020, 9 pages.
(Continued)

*Primary Examiner* — Kerri L McNally
(74) *Attorney, Agent, or Firm* — Fiala & Weaver P.L.L.C.

(57) ABSTRACT

An Intelligent Transportation System, ITS, service station is disclosed. The ITS service station has: a receiver, having an area of radio coverage, configured to receive a first Collective Perception Message, CPM, from a first ITS station at a first position within the coverage area, the first CPM including first sensor data on an object perceived by the first ITS station; an aggregator connected to the receiver and configured to aggregate said first sensor data with at least one second sensor data on the same object into a third sensor data, which second sensor data either is received via the receiver in a second CPM from a second ITS station at a second position within the coverage area perceiving the same object or is determined by a sensor of the ITS service station perceiving the same object; and a transmitter configured to broadcast said third sensor data in a third CPM.

20 Claims, 5 Drawing Sheets

(51) Int. Cl.
  *G06Q 50/30* (2012.01)
  *G08G 1/052* (2006.01)
  *G08G 1/056* (2006.01)

(52) U.S. Cl.
  CPC .......... *G08G 1/0116* (2013.01); *G08G 1/052* (2013.01); *G08G 1/056* (2013.01)

(58) Field of Classification Search
  USPC ........................................................ 340/935
  See application file for complete search history.

(56) References Cited

U.S. PATENT DOCUMENTS

| | | | |
|---|---|---|---|
| 2019/0068639 A1* | 2/2019 | Alexander | H04W 4/46 |
| 2019/0098088 A1* | 3/2019 | Baltar | H04L 67/12 |
| 2019/0221110 A1* | 7/2019 | Vanderveen | G01S 5/0072 |

OTHER PUBLICATIONS

Rauch, et al., "Analysis of V2X Communication Parameters for the Development of a Fusion Architecture for Cooperative Perception Systems", Intelligent Vehicles Symposium (IV), IEEE, XP-031998989, 2011, pp. 685-690.

* cited by examiner

SERVICE STATION FOR AN INTELLIGENT TRANSPORTATION SYSTEM

CROSS-REFERENCE TO RELATED APPLICATION(S)

This application claims priority to European Patent Application No. 19 186 790.2, filed on Jul. 17, 2019, the entirety of which is incorporated by reference herein.

BACKGROUND

Technical Field

The present disclosed subject matter relates to a service station for an Intelligent Transportation System (ITS).

Background Art

The basic ITS communication architecture is described in ETSI (European Telecommunications Standards Institute) Standard EN 302 665 and related ETSI standards. A most recent development in ITS is the so-called Collective Perception Service (CPS) to share information on objects detected by one communication partner, such as a vehicle onboard unit (OBU) or a roadside unit (RSU) (generally called "ITS station", ITS-S), with another communication partner (ITS-S). The CPS in ITS is described in, e.g., ETSI Technical Report TR 103 562 and ETSI Technical Specification TS 103 324.

Figure 1C:
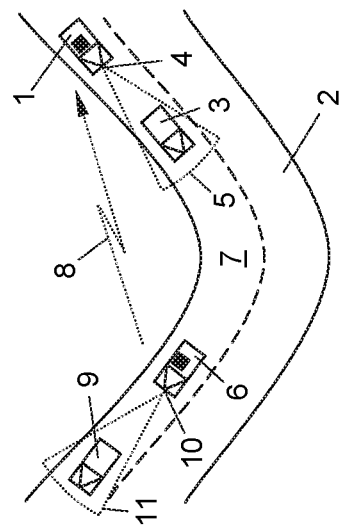
Figure 1B:
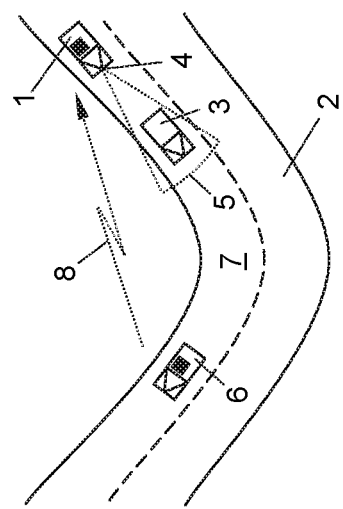
Figure 1A:
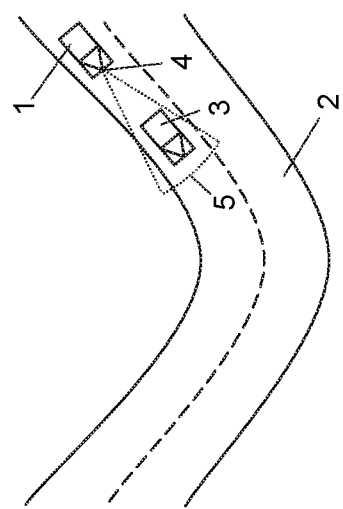

FIGS. 1a-1c show the present concept of CPS to share "perceptions" (detections, analysis and/or trackings) of objects among participants according to the above-mentioned ETSI standards. In FIG. 1a a vehicle 1 on a road 2 perceives an object 3, e.g., another vehicle, by means of an own sensor 4 such as a camera, a radar sensor, lidar sensor etc., with a field of view 5. In FIG. 1b the vehicle 1 may be additionally aware of a third vehicle 6 around a bend 7 of the road 2 which obstructs the direct view to the vehicle 6, by means of a wireless communication 8 between an ITS-S aboard the vehicle 6 and an own ITS-S aboard the vehicle 1. In FIG. 1c the third vehicle 6 around the bend 7 perceives a fourth vehicle 9 by means of an own sensor 10 with a field of view 11 and shares information about this perception over the wireless communication 8 with the first vehicle 1. Vehicle 1 thus enjoys the benefit of a "Collective Perception" (CP) from other ITS-S-equipped participants so that it becomes aware of objects beyond its own sensor range even when those objects are not equipped with an ITS-S on their own.

Figure 2:
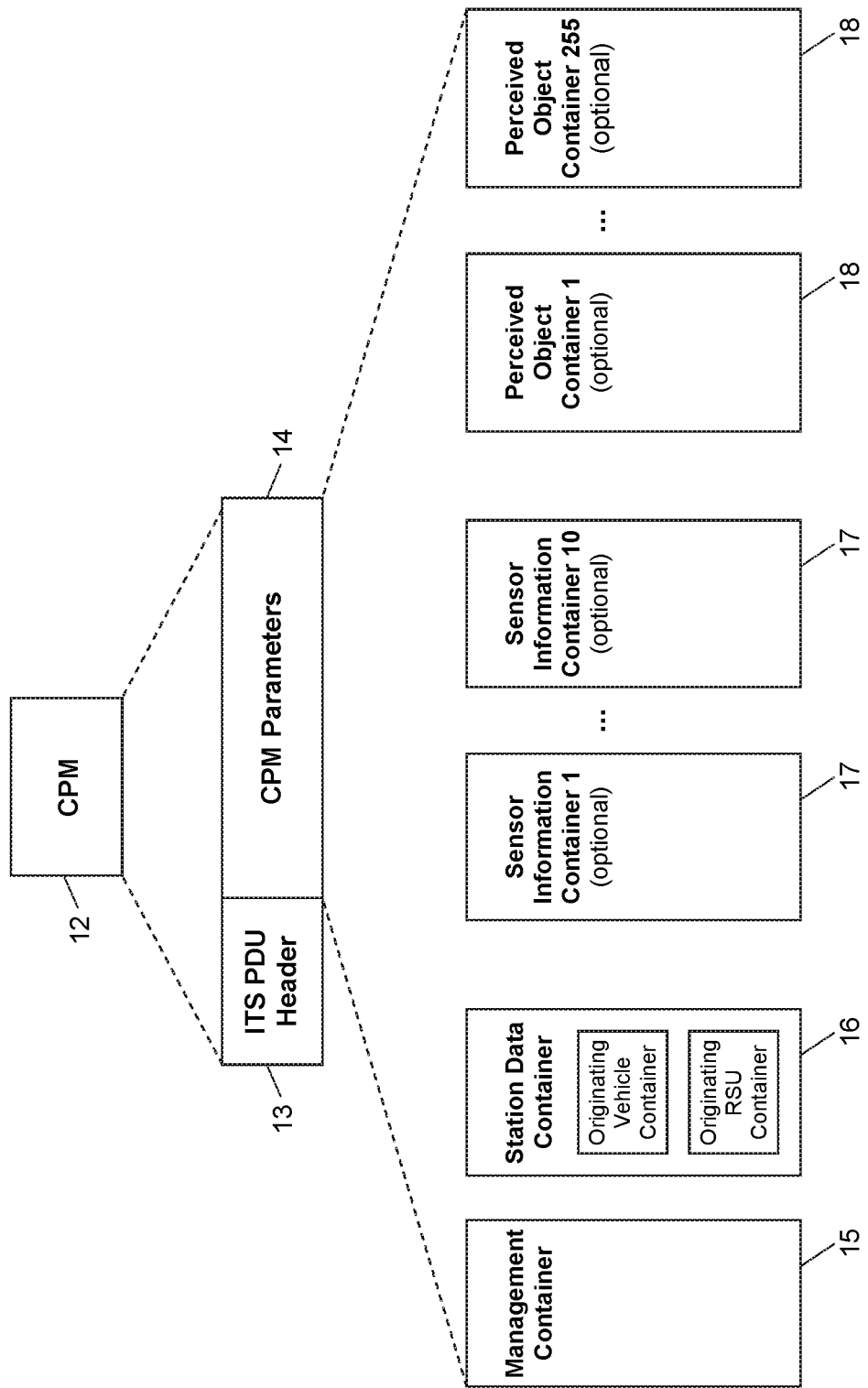

The messages exchanged in the CPS to share such perceptions (here: the message from the ITS-S of the vehicle 10 over the wireless communication 8 to the ITS-S of the vehicle 1) to inform the communication partner (here: the vehicle 1) about the existence, speed, distance, position, direction etc. of a perceived object (here: the vehicle 9) are called Collective Perception Messages (CPMs). FIG. 2 shows the general structure of a CPM as defined in ETSI TR 103 562. The CPM 12 contains—apart from an ITS PDU (Protocol Data Unit) header 13 designating the message as a "CPM package"—a set of CPM parameters 14 in the form of one or more data containers 15-18, in particular:

- a management container 15 containing basic information about the transmitting ITS-S (in the example of FIG. 1: the vehicle 6), such as the station's type (e.g., OBU or RSU) and the station's absolute position;
- a station data container 16 with further details, such as the dynamic state or map references of the transmitting ITS-S;
- none, one or more sensor information containers 17 describing the sensory capabilities of the transmitting ITS-S, such as range, aperture and position of the sensor/s; and
- none, one or more perceived object containers 18 containing detailed information about the perceived objects (here: the vehicle 9). Each perceived object is assigned a local object identifier by the ITS-S generating the CPM which remains constant as long as the object is detected and tracked by the ITS-S.

In particular, according to ETSI TR 103 562 a perceived object container 18 may contain sensor data such as distance, speed, acceleration, heading (angle) of a perceived object 9 as measured by the ITS-S's sensor 10, and an indication of the time of measurement of the sensor data. For some data elements, e.g., for distance, speed, angle and object dimension values, ETSI TR 103 562 also provides for confidence measures of the respective data values. The receiving ITS-S can then assess the trustworthiness of the collectively shared perception information.

In general, it is up to the receiving ITS-S to make good use of the wealth of collectively shared sensor data to appropriately execute road safety applications, such as driver warnings or automatic braking and steering functions. However, the wealth of information can overload the processing capabilities of receiving ITS-S in heavy traffic situations, leading either to malfunctions or the need for higher processing powers with increased costs.

BRIEF SUMMARY

It is an object of the disclosed subject matter to overcome the shortcomings of the prior art and to provide novel devices for improving CPS in ITS.

To this end, the disclosed subject matter creates a novel ITS service station, comprising:

a receiver having an area of radio coverage and being configured to receive a first CPM from a first ITS-S at a first position within the coverage area, the first CPM including first sensor data on an object perceived by the first ITS-S;

an aggregator connected to the receiver and configured to aggregate said first sensor data with at least one second sensor data on the same object into a third sensor data, which second sensor data either is received via the receiver in a second CPM from a second ITS-S at a second position within the coverage area perceiving the same object or is determined by a sensor of the ITS service station perceiving the same object; and a transmitter connected to the aggregator and configured to broadcast said third sensor data in a third CPM.

The novel ITS service station of the disclosed subject matter aggregates CPMs from surrounding ITS-S into aggregated ("third") CPMs so that other ITS-S listening to these broadcasts are eased from the burden of following a multitude of ITS-S and processing a multitude of CPMs. The ITS service station of the disclosed subject matter therefore contributes to reduce the complexity of the CPS for listening ITS-S, in particular when the aggregated CPMs of the ITS service station are prioritized over "normal" CPMs during communication or receipt.

An embodiment of the disclosed subject matter is characterized in that the first sensor data includes a first data value and a first confidence measure of said first data value and the at least one second sensor data includes a second data value and a second confidence measure of said second data value, wherein the aggregator is configured to calculate a third data value from said first and at least one second data values and a third confidence measure from said first and at least one second confidence measures and to include said third data value and third confidence measure in the third sensor data.

An aggregated ("third") data value in the aggregated ("third") CPM will most likely have a better aggregated ("third") confidence measure since it had been aggregated from multiple data sources. Therefore, any ITS-S listening to both "normal" CPMs (here: the first and second CPMs) and "aggregated" CPMs (here: the "third" CPM of the disclosed ITS service station) can choose to process and consider the CPM showing the best confidence measure for a specific data value needed, leading to an implicit prioritizing of the CPMs of the ITS service station at the receiving ITS-S. The receiving ITS-S may ignore sensor data regarding the same object from all other CPMs in favor of the sensor data on this object in the aggregated CPM. Processing load in the receiving ITS-S is thus significantly reduced, in particular in heavy traffic situations, e.g., at an intersection, and low-cost ITS-S with modest processing capabilities can be used without compromising safety.

In one embodiment, the aggregator is configured to determine objects in relation to sensor data to be the same when the objects match in one or more of object positions, speeds, headings, and accelerations, as indicated in the respective CPMs. This leads to accurate matching results, however, requires that the respective object positions are either geo-referenced to a common or global coordinate system, e.g., given as absolute geo-coordinates, or map-matched to streets, places, landmarks etc. in a map.

Alternatively—or additionally, for added accuracy and reliability—the aggregator is configured to determine objects in relation to sensor data to be the same when the objects match at least in object appearance characteristics indicated in the respective CPMs. Appearance characteristics can be any one or more of: an object dimension, colour, shape, orientation etc. The mapping as to object appearance can be useful when object positions are indicated relatively to a perceiving ITS-S or are not accurate enough to distinguish between objects close to each other. Appearance and position matching can also be combined to improve the accuracy of the match.

The third sensor data may additionally include the number (count) of first and second sensor data from which the third sensor data has been aggregated, and/or may additionally include the number (count) of first and second ITS-S from whose CPMs the third sensor data has been aggregated. An ITS-S receiving the aggregated CPM can use this information to further assess the confidence of a sensor data value indicated therein.

According to a further optional feature of the disclosed subject matter each sensor data includes a local identifier of the object related to said sensor data and the aggregator is configured to assign a global identifier to all local identifiers relating to the same object and to include that global identifier in the third CPM. Receiving ITS-S can then use the global object identifiers in, e.g., own CPMs sent to other participants. If the assignment table between local and global identifiers is disseminated from the ITS service station to the receiving ITS-S, too, e.g., within the aggregated CPM or in a separate broadcast message, then receiving ITS-S may more easily match the sensor data on an object from the aggregated CPM with the sensor data on the same object from other "normal" CPMs without the need of own position and/or appearance matches to determine the identity of objects over different CPMs.

For keeping inventory and tracking of objects in its area of coverage over time, the aggregator of the ITS service station may have a memory for storing first and second CPMs including timestamps of the sensor data therein and may be configured to retrieve, for aggregating said third CPM, all sensor data from the memory having timestamps falling within a selected period of time.

Although the aggregated CPMs of the ITS service station of the disclosed subject matter may implicitly have priority over "normal" CPMs in that they will usually carry sensor data with higher confidence measures than the normal CPMs of other ITS-S, the aggregated CPMs of the ITS service station may additionally be flagged with a higher priority than normal CPMs. This may be done by, e.g., including a "high priority" flag in the header of the aggregated CPM. Receiving ITS-S then do not need to compare confidence measures to prioritize aggregated CPM over normal CPMs, but just will look for the high priority flag, to speed up processing.

The ITS service station of the disclosed subject matter can either be moveable, e.g., in the form of an onboard unit on a vehicle, or stationary, such as a roadside unit or infrastructure. In one embodiment the ITS service station is a roadside unit at an intersection. At intersections high vehicle traffic and hence communication traffic is to be expected so that receiving ITS-S benefit most from the load-reducing and safety-increasing CPM aggregation service of the disclosed ITS service station.

BRIEF DESCRIPTION OF THE DRAWINGS/FIGURES

Figure 3:
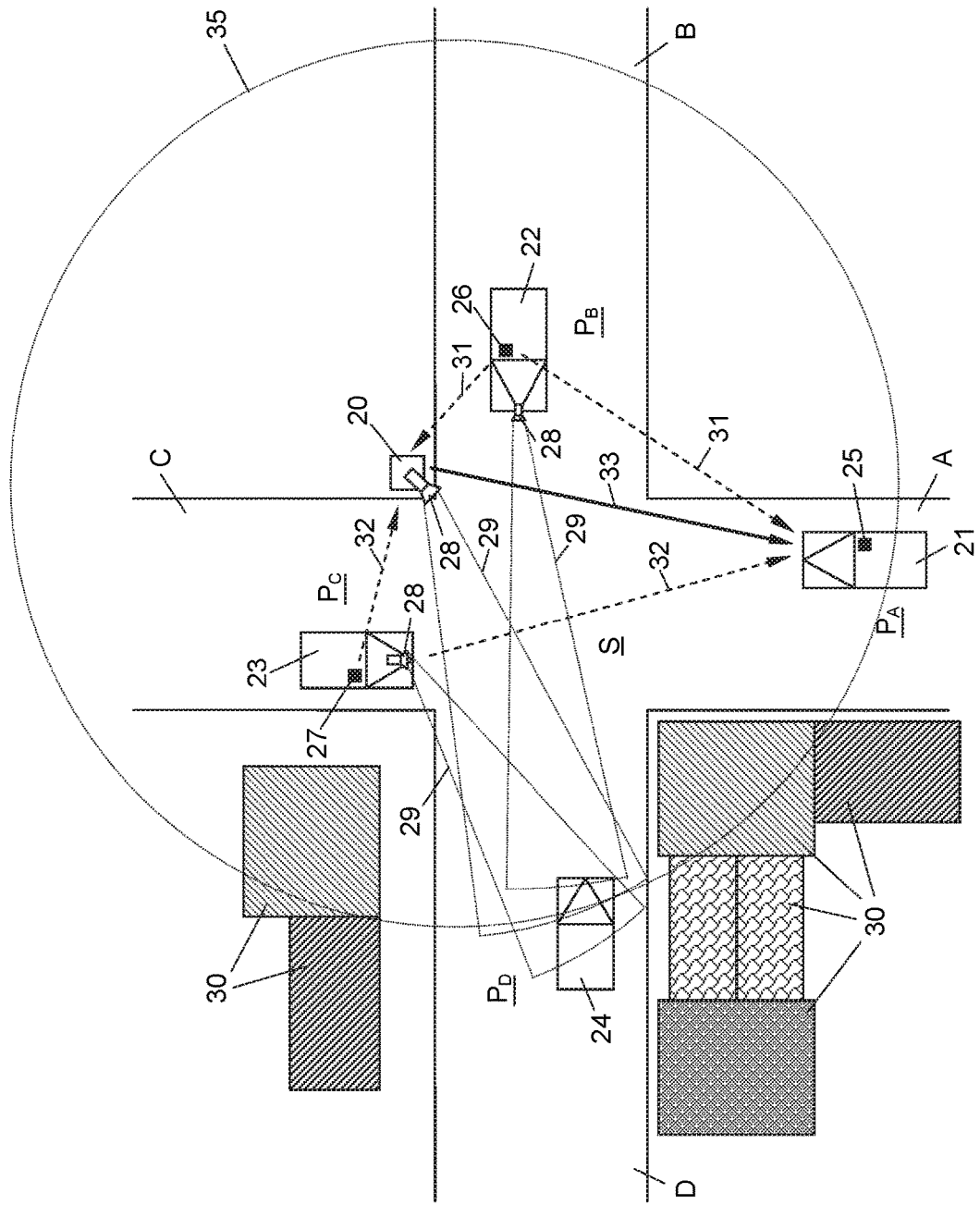
Figure 4:
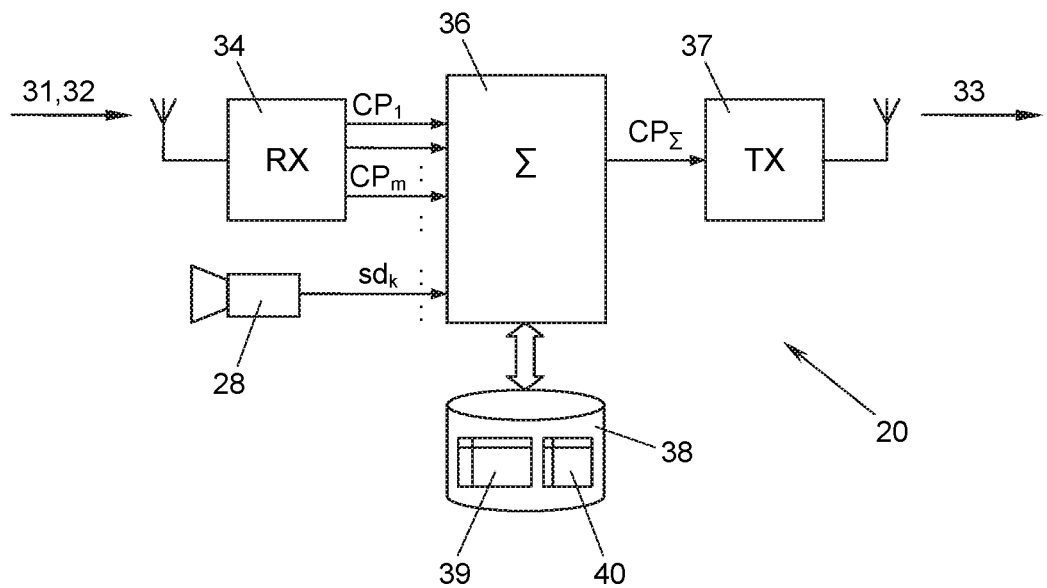
Figure 5C:
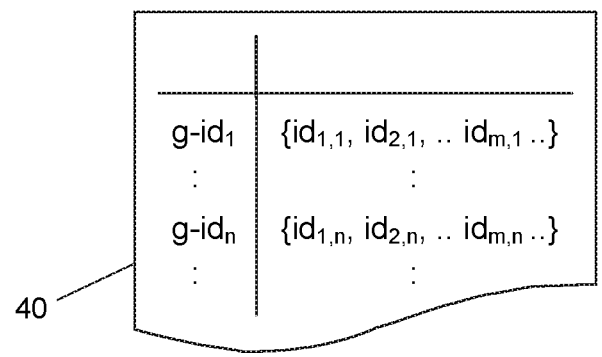
Figure 5A:
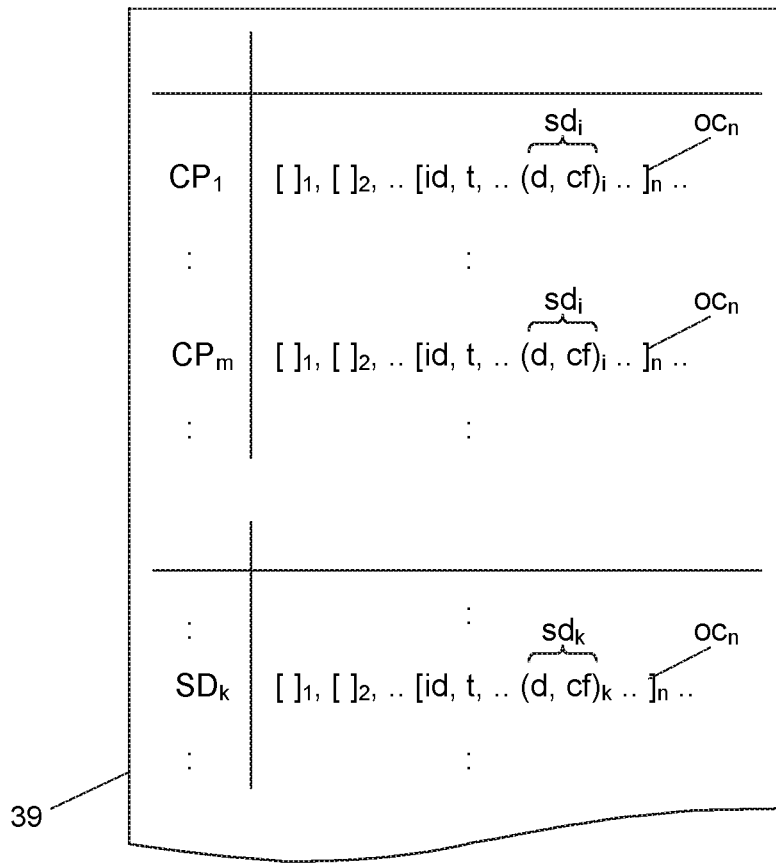
Figure 5B:
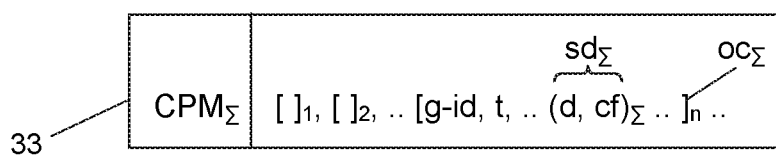

The disclosed subject matter will now be described in further detail by means of exemplary embodiments thereof under reference to the enclosed drawings, in which show:

FIGS. 1a-1c the basic concept of Collective Perception in ITS according to the state of the art in three plan views of an exemplary road section;

FIG. 2 a data structure of a CPM according to the state of the art;

FIG. 3 an ITS service station according to the disclosed subject matter at an intersection in a plan view;

FIG. 4 an ITS service station according to the disclosed subject matter in a block diagram;

FIG. 5a an exemplary memory contents of the ITS service station of FIG. 4;

FIG. 5b an example of an aggregated CPM as broadcast by the ITS service station of FIG. 4; and FIG. 5c an exemplary object identifier assignment table in the memory of the ITS service station of FIG. 4.

DETAILED DESCRIPTION

FIGS. 1 and 2 referring to the CPS in ITS and the CPM data structure, respectively, have been explained at outset.

FIG. 3 shows an ITS service station 20 mounted stationarily as a roadside unit (RSU) at one of the corners of an intersection S between four roads A, B, C, D. Four exemplary vehicles 21-24 are shown approaching or just about to enter the intersection S. The positions of the vehicles 21-24 on the roads A-D are designated as $P_A$, $P_B$, $P_C$ and $P_D$, respectively.

The vehicles 21-23 each carry an ITS-S 25-27 in the form of an onboard unit (OBU). Vehicles 22, 23 are exemplarily equipped with a sensor 28 with a respective field of view 29, capable of perceiving an object (here: the fourth vehicle 24). The sensors 28 may be of any kind, e.g., a camera, a radar or lidar sensor, an acoustic sensor, a vibration sensor, an infrared sensor etc. The ITS service station 20, too, may have an own sensor 28 to perceive objects 24 in its vicinity, although this is not obligatory. Generally speaking, each of the ITS-S 25-27 and ITS service station 20 may have none, one or more sensors 28, also of different sensor types.

Instead of being stationarily mounted as a roadside unit, the ITS service station 20 could also be mobile, e.g., aboard a vehicle as an OBU.

The object 24 perceived by the sensors 28 may be of any kind, e.g., a manned or unmanned land, sea or air vehicle, a pedestrian, an animal, a machine, a traffic sign, a radio, a light or infrared beacon broadcasting some kind of information which is useful to be collectively perceived, and the like.

In the traffic scenario depicted in FIG. 3, the vehicle 21 cannot see the object (here: vehicle) 24 approaching the intersection S since its view is blocked by buildings 30 at the corner of the roads A and D. However, the vehicles 22, 23 share their perception of the vehicle 24, as detected by their sensors 28, via CPMs 31, 32 sent from their ITS-S 26, 27 (the "perceiving" or "disseminating" ITS-S) to the ITS-S 25 (the "receiving" or "listening" ITS-S) of the vehicle 21. These "normal" CPMs 31, 32 are also received by the ITS service station 20, which creates an "aggregated" CPM 33 therefrom, as follows.

With reference to FIGS. 3 and 4, the ITS service station 20 has a receiver 34 with an area of radio coverage 35 to receive the CPMs 31, 32 from the ITS-S 26, 27 in its neighborhood. It goes without saying that the radio coverage area 35 will be dependent both on the transmitting power of the disseminating ITS-S 26, 27 and the receiving sensitivity of the receiver 34. For ease of description, the various normal CPMs 31, 32 . . . are designated as $CP_1$, $CP_2$, . . . , generally $CP_m$, in the following.

An aggregator 36 connected to the receiver 34 processes the set $\{CP_m\}$ of the received CPMs $CP_m$ and calculates the aggregated CPM 33, called $CP_\Sigma$ in the following, therefrom. The aggregated CPM $CP_\Sigma$ is then broadcast by a transmitter 37 connected to the output of the aggregator 36 so that it can be received by listening ITS-S in the vicinity, such as (here) the ITS-S 25 on the vehicle 21. The transmitter 37 and the receiver 34 of the ITS service station 20 can be implemented by a combined transceiver, too.

To calculate the aggregated CPM $CP_\Sigma$ from the received normal CPMs $CP_m$ the aggregator 36 has a memory 38 in which—among other programs and data as needed—two tables are stored: a table 39 storing the CPMs $CP_m$, shown in FIG. 5a, and an (optional) table 40 storing assignments between global and local object identifiers, shown in FIG. 5c and described further down below.

With reference to FIGS. 2 and 5a a CPM 12, 31, 32 or $CP_m$, respectively, contains—apart from the other data depicted in FIG. 2—in any perceived object container 18, here called $oc_1$, $oc_2$, . . . , generally $oc_n$, a local object identifier id, usually assigned by the perceiving ITS-S 26, 27, and one or more sensor data $sd_i$ (i=1, 2, . . . ) on the object 24 with the local object identifier $id_n$.

The sensor data $sd_i$ on an object 24 perceived by a disseminating ITS-S 26, 27 may contain any data value $d_i$ derived from an output of one or more sensor/s 28, e.g., a distance of the object 24 to the sensor 28, a speed of the object 24, a geo-referenced or map-matched position $P_D$ of the object 24, a heading, angle or path of travel of the object 24, one or more dimensions of the object 24, a shape, color or class of the object 24 as determined by the sensor 28, e.g., as taken by a camera and determined by image processing, etc. For example, any of the data items in the perceived object container 18 of a CPM according to ETSI TR 103 562 can be the data value d, such as the data elements xDistance, yDistance, zDistance, xSpeed, ySpeed, zSpeed, xAcceleration, yAcceleration, zAcceleration, yawAngle, planarObjectDimension1, planarObjectDimension2, verticalObjectDimension, objectRefPoint, dynamicStatus, Classification, MatchedPosition according to ETSI TR 103 562.

Some of the data values $d_i$ which are provided by the respective sensor 28 or a suitable processor connected to the sensor/s 28 in the ITS-S 26, 27 or the ITS service station 20 may be provided with a confidence measure $cf_i$, in particular the distance, speed, angle and dimension data values $d_i$. For such data values $d_i$, the respective sensor data $sd_i$ is a pair (d, cf)$_i$ comprised of the data value $d_i$ and the associated confidence measure $cf_i$.

The confidence measure $cf_i$ of a data value $d_i$ may be any statistical measure of the confidence, reliability, trustworthiness, non-error rate etc. of this data value $d_i$. For example, the confidence measure $cf_i$ can be the 95%-confidence interval of the respective data value $d_i$, i.e., that with a probability of 95% the data value falls within this interval. Of course, other measures of confidence could be used as explained later on.

If the ITS service station 20 has one or more own sensors 28 which generate their own sensor data $sd_k$ (k=1, 2, . . . ), the output of these sensors 28 can, e.g., be stored—in the same format as the received CPMs $CP_m$—in data records $SD_1$, $SD_2$, . . . , generally $SD_k$, for example in the same table 39, as shown in FIG. 5a.

From at least two received CPMs $CP_m$, or at least one received CPM $CP_m$ and at least one sensor data record $SD_k$, the aggregator 36 calculates the aggregated CPM $CP_\Sigma$ as follows.

As shown in FIG. 5b, an aggregated sensor data $sd_\Sigma$ can be any aggregation of sensor data $sd_i$, $sd_k$ of the same sensor type (i.e., the same type of sensor 28 or combination of sensors 28) from at least two different CPMs $CP_m$ or at least one CPM $CP_m$ and at least one record $SD_k$. By means of "aggregation" any mathematical operation or representation which can be performed on two or more data values $d_i$ and $d_k$ which yields one data value $d_\Sigma$ shall be understood. For example, the aggregated data value $d_\Sigma$ can be an average or weighted average of the individual data values $d_i$, $d_k$ of which it has been aggregated. Alternatively, the aggregated data value $d_\Sigma$ could be that one of the originating data values $d_i$, $d_k$ which has the best confidence measure $cf_i$, $cf_k$, respectively. Or, the aggregated data value $d_\Sigma$ is an average or weighted average of just the two or three data values $d_i$, $d_k$ with the best confidence measures. Furthermore, for a weighted average the individual data values $d_i$, $d_k$ could be weighted by their respective confidence measures $cf_i$, $cf_k$. As an example, one embodiment of an aggregation function F for a data value $d_\Sigma$ formed from at least two different CPMs $CP_i$ (i=1 N) could be:

$$d_\Sigma = F(d_1, \ldots, d_N) = \frac{\sum_{i=1}^{N} d_i}{N} \qquad (1)$$

Of course, other aggregation functions F could be used such as, for example, using only the data value $d_i$ with the "best" confidence measure $cf_i$ as the aggregated data value $d_\Sigma$, using step functions or a binary decision tree to select one or more data value/s $d_i$ with "good" confidence measure/s surpassing a specified threshold while discarding other ones below the threshold, including other information such as the number (count) of data sources (stations 20, 26, 27 and/or sensors 28), their positions, speeds and/or headings with respect to the object 24, the field of view 29 of the respective sensors 29, etc.

Furthermore, also sensor data $sd_i$, $sd_k$ from more than one sensor 28 of an ITS-S 26, 27 and/or the ITS service station 20 which relate to the same object 24 can be aggregated into one aggregated sensor data $sd_\Sigma$ for that object 24, e.g., by combining different dimension values into a shape value, or combining speed and heading values into a movement vector, etc.

If data values $d_i$, $d_k$ with respective confidence measures $cf_i$, $cf_k$ are used in the aggregation function F the data values $d_i$, $d_k$ could be weighted with their respective confidence measures $cf_i$, $cf_k$, for example as follows:

$$d_\Sigma = F(d_1, \ldots, d_N; cf_1, \ldots, cf_N) = \frac{\sum_{i=1}^{N} d_i \frac{1}{cf_i}}{\sum_{i=1}^{N} \frac{1}{cf_i}} \quad (2)$$

The aggregated sensor data $sd_\Sigma$ can have an aggregated confidence measure $cf_\Sigma$ attributed to the aggregated data value $d_\Sigma$. Any statistical operation or measure can be applied to calculate this aggregated confidence measure $cf_\Sigma$. The type of calculation also depends on which type of confidence measure is used for the confidence measure $cf_i$, $cf_k$ in the CPMs $CP_m$ and data records $SD_k$.

For example, the confidence measure $cf_i$, $cf_k$ could be indicated in the form of a confidence interval into which a given percentage of all readings of a sensor 28 falls, e.g., a confidence interval for a percentage (confidence level) of 95%. Or, the other way round, the confidence measure $cf_i$, $cf_k$ could be indicated as the percentage (confidence level) of all measurements of a sensor 28 which fall into a given confidence interval (error range). All sorts of known statistical measures for indicating such confidence measures can be used.

For example, if the confidence measure $cf_i$, $cf_k$ is indicated as that confidence interval into which 95% of all measurements fall (the "95%-confidence level"-confidence interval) as used in ETSI TR 103 562 for indicating the confidence of the data values distance, speed, angle and dimension, and if we assume the sensors 28 to have a Gaussian error distribution, for the exemplary aggregation function F given in equation (2) the aggregated confidence measure $cf_\Sigma$ can be calculated using $$\sigma_\Sigma^2 = \frac{\sum_{i=1}^{N} \sigma_i^2 \left(\frac{1}{cf_i}\right)^2}{\left(\sum_{i=1}^{N} \frac{1}{cf_i}\right)^2} \quad (3)$$

as $$cf_\Sigma = 2 \cdot \sigma_\Sigma \cdot \Phi^{-1}\left(\frac{1 + 0.95}{2}\right) \quad (4)$$

wherein $\Phi$ designates the Cumulative Distribution Function and $\Phi^{-1}$ designates the inverse thereof.

When other aggregation functions F than that of equation (2) are used, the aggregated confidence measure $cf_\Sigma$—be it indicated as a confidence level for a given confidence interval or as a confidence interval for a given confidence level—can be calculated accordingly, as known in the art of statistics and error propagation calculus.

The aggregated confidence measure $cf_\Sigma$ can also be a composite field or concatenation of the confidence measure $cf_\Sigma$ as calculated above and other information such as the number (count) of data sources responsible for that confidence measure $cf_\Sigma$, their positions, speeds and/or headings with respect to the object 24, the fields of view 29 of the respective sensors 28, etc. For example, the more different the positions of the data sources, i.e. the positions of the sensors 28 and/or the positions of the stations 20, 26, 27, with respect to a specific object 24 are, the better the data quality of the data value $d_\Sigma$ aggregated therefrom is.

To be able to aggregate the originating data values $d_i$, $d_k$ or originating sensor data $sd_i$, $sd_k$ (including the respective confidence measures $cf_i$, $cf_k$, if applicable) into the aggregated data value $d_\Sigma$ or sensor data $sd_\Sigma$, respectively, the aggregator 36 has to determine that the originating data values or sensor data all relate to the same perceived object 24. This is easy if the object identifiers id in the respective CPM $CP_m$ and/or data records $SD_k$ are the same. This may happen when the disseminating ITS-S 26, 27 (and the ITS service station 20, if provided with an own sensor 28) already use "global" object identifiers instead of "local" object identifiers. The term "local" object identifier refers to an object identifier id which had been assigned by the respective station 26, 27, 20 itself (locally), whereas the term "global" object identifier, here designated g-id in the following, refers to an object identifier which had been assigned by the ITS service station 20 at least "area wide" in its area of coverage 35.

To this end, the ITS service station 20, and in particular the aggregator 36, optionally hosts and manages the assignment table 40 in the memory 38, storing an association (assignment) between a global object identifier $g\text{-}id_n$ and all local object identifiers $id_{m,n}$ regarding the same perceived object 24, as described in a perceived object container $oc_n$, from a multitude of different CPMs $CP_m$ received (plus, if applicable, of different data records $SD_k$ stored).

FIG. 5c shows an example of the assignment table 40. The aggregator 36 may disseminate the table 40 in its aggregated CPMs $CP_\Sigma$ or in separate broadcasts such as CAMs (Common Awareness Messages) or BST (Beacon Service Table) messages to all listening ITS-S 25-27 in its area of coverage 35. Listening ITS-S 25-27 may then use the disseminated global object identifiers $g\text{-}id_n$ in their CPMs $CP_m$ to the ITS service station 20, so that matching the data values $d_i$, $d_k$ or sensor data $sd_i$, $sd_k$, respectively, as to the "same" object 24 can be done by looking for the same global object identifier $g\text{-}id_n$.

On the other hand, the aggregator 36 can determine itself whether objects 24 about which sensor data $sd_i$ is communicated in the CPMs $CP_m$ (or sensor data $sd_k$ is recorded in the records $SD_k$) relate to the same object 24. To this end, sensor data $sd_i$, $sd_k$ indicative of object positions—be they given "absolutely" in terms of a global or at least geo-referenced coordinate system or "relatively" to the position of the respective disseminating ITS-S 26, 27 and then converted into global or geo-referenced coordinates or map-matched position data—may be matched to each other so that congruency (within a certain error margin) in position indicates the same object. Alternatively or additionally, further movement characteristics of the object 24 can be taken into account in the match, such object speed, heading, and/or acceleration.

Alternatively, object identity could be determined by the aggregator 36 by means of analyzing sensor data $sd_j$, $sd_k$ indicative of one or more characteristics of an object's appearance, such as one or more dimension/s of an object 24, its color, shape, orientation, heading etc.

Both methods of matching, as to object positions and as to object appearance characteristics, can be combined to increase the accuracy of the match.

Based on the matches found, the aggregator 36 can then assign the global object identifier $g\text{-}id_n$ to the local object identifiers $id_j$, $id_k$ of the matching objects 24.

The aggregation performed by the aggregator 36 may take into account timing aspects. Each CPM $CP_m$ and record $SD_k$, and in particular each perceived object container $oc_n$ or even each individual sensor data $sd_j$, $sd_k$, may contain a timestamp t indicative of the time of measurement of the respective sensor data $sd_j$, $sd_k$. The timestamp t may be indicated in any suitable format, be it relatively to a time of sending the respective $CP_m$ or the time of storing the respective record $SD_k$, or absolutely in terms of a system-wide reference clock.

The timestamps t can also take into account the track or estimated movement of a perceived object 24, and any calculation, processing or transmission delays. In this way, the "age" of a sensor data $sd_j$, $sk_k$ can be accounted for by the aggregator 36 when matching objects 24 for identity and/or calculating the aggregated CPM $CP_\Sigma$. For example, the aggregator 36 may, when aggregating the CPM $CP_\Sigma$, only use sensor data $sd_k$ from its memory 38 whose timestamps t fall within a selected period of time, for example into a past cycle interval, when the ITS service station 20 cyclically sends CPMs $CP_\Sigma$.

An aggregated sensor data $sd_\Sigma$ may even relate to a "global" object confidence of the perceived object 24 taking into account sensor data $sd_j$, $sd_k$ of different (sensor) types.

In the aggregated CPM $CP_\Sigma$ the aggregator 36 may optionally include the number (count) of originating sensor data $sd_j$, $sd_k$ from which a specific aggregated sensor data $sd_\Sigma$ had been aggregated, and/or the number (count) of disseminating ITS-S 26, 27 from whose CPMs $CP_m$ that specific aggregated sensor data $sd_\Sigma$ had been aggregated. The numbers (counts) can be, e.g., attached as data fields to the respective aggregated confidence value/s $cf_\Sigma$ in the aggregated CPM $CP_\Sigma$. These numbers (counts) can then be used by a receiving ITS-S 25 to select if or which one of several received aggregated CPM $CP_\Sigma$ is to trust most regarding a specific sensor data.

Usually, the receiving ITS station 25 will select and use that aggregated sensor data $sd_\Sigma$ on an object 24 which has the best confidence measure $cf_\Sigma$ attributed to it, e.g., the smallest confidence interval or the highest confidence level, when the confidence measure is expressed in such terms. However, with the additional knowledge of the numbers (counts) of originating sensor data or ITS-S, from which the sensor data $sd_\Sigma$ had been aggregated, the receiving ITS-S 25 can improve the selection, e.g., by weighting the confidence measures $cf_\Sigma$ by their respective numbers (counts) of underlying data. On the other hand, said numbers (counts) may be particularly useful for sensor data $sd_\Sigma$ which does not comprise a confidence measure $cf_\Sigma$ at all. For example, it the data value $d_\Sigma$ in the sensor data $sd_\Sigma$ is an average of the originating data values $d_j$, $d_k$, the number (count) of averaged values is a measure of the quality of the process of averaging.

The aggregated CPMs $CP_\Sigma$ broadcast by the ITS service station 20 as CPMs 33 may optionally contain a "high priority" flag or a flag indicating a priority which is higher than those of the "normal" CPMs $CP_m$ (CPMs 31, 32). ITS-S 24 listening to the CPMs 31, 32 may prefer CPMs 33 with higher priority (or disregard CPMs 31, 32 with lower priority) so that the aggregated CPMs 33 of the ITS service station 20 are favored.

CONCLUSION

The disclosed subject matter is not restricted to the specific embodiments disclosed herein, but encompasses all modifications, variants and combinations thereof that fall within the scope of the appended claims.

What is claimed is:

1. An Intelligent Transportation System (ITS) service station, comprising:
   a receiver having an area of radio coverage and being configured to receive a first Collective Perception Message (CPM) from a first ITS station at a first position within the coverage area, the first CPM including first sensor data on an object perceived by the first ITS station;
   an aggregator connected to the receiver and configured to aggregate said first sensor data with at least one second sensor data on the same object into a third sensor data, which second sensor data is received via the receiver in a second CPM from a second ITS station at a second position within the coverage area perceiving the same object; and
   a transmitter connected to the aggregator and configured to broadcast said third sensor data in a third CPM.

2. The ITS service station according to claim 1, wherein the first sensor data includes a first data value and a first confidence measure of said first data value and the at least one second sensor data includes a second data value and a second confidence measure of said second data value, wherein the aggregator is configured to calculate a third data value from said first and at least one second data values and a third confidence measure from said first and at least one second confidence measures and to include said third data value and third confidence measure in the third sensor data.

3. The ITS service station according to claim 1, wherein the aggregator is configured to determine objects in relation to sensor data to be the same when the objects match in one or more of object positions, speeds, headings, and accelerations.

4. The ITS service station according to claim 1, wherein the aggregator is configured to determine objects in relation to sensor data to be the same when the objects match at least in object appearance characteristics.

5. An Intelligent Transportation System (ITS) service station, comprising:
   a receiver having an area of radio coverage and being configured to receive a first Collective Perception Message (CPM) from a first ITS station at a first position within the coverage area, the first CPM including first sensor data on an object perceived by the first ITS station;

an aggregator connected to the receiver and configured to aggregate said first sensor data with at least one second sensor data on the same object into a third sensor data, which second sensor data either is received via the receiver in a second CPM from a second ITS station at a second position within the coverage area perceiving the same object or is determined by a sensor of the ITS service station perceiving the same object; and a transmitter connected to the aggregator and configured to broadcast said third sensor data in a third CPM;

wherein the third sensor data includes a count of first and second sensor data from which the third sensor data has been aggregated.

6. An Intelligent Transportation System (ITS) service station, comprising:

a receiver having an area of radio coverage and being configured to receive a first Collective Perception Message (CPM) from a first ITS station at a first position within the coverage area, the first CPM including first sensor data on an object perceived by the first ITS station:

an aggregator connected to the receiver and configured to aggregate said first sensor data with at least one second sensor data on the same object into a third sensor data, which second sensor data either is received via the receiver in a second CPM from a second ITS station at a second position within the coverage area perceiving the same object or is determined by a sensor of the ITS service station perceiving the same object; and a transmitter connected to the aggregator and configured to broadcast said third sensor data in a third CPM;

wherein the third sensor data includes a count of first and second ITS stations from whose CPMs the third sensor data has been aggregated.

7. An Intelligent Transportation System (ITS) service station, comprising:

a receiver having an area of radio coverage and being configured to receive a first Collective Perception Message (CPM) from a first ITS station at a first position within the coverage area, the first CPM including first sensor data on an object perceived by the first ITS station:

an aggregator connected to the receiver and configured to aggregate said first sensor data with at least one second sensor data on the same object into a third sensor data, which second sensor data either is received via the receiver in a second CPM from a second ITS station at a second position within the coverage area perceiving the same object or is determined by a sensor of the ITS service station perceiving the same object; and a transmitter connected to the aggregator and configured to broadcast said third sensor data in a third CPM;

wherein each sensor data includes a local identifier of the object related to said sensor data, wherein the aggregator is configured to assign a global identifier to all local identifiers relating to the same object and to include that global identifier in the third CPM.

8. The ITS service station according to claim 7, wherein the aggregator is configured to store the assignment between the global identifier and the local identifiers in an assignment table and to broadcast said assignment table in the third CPM or in a separate message.

9. An Intelligent Transportation System (ITS) service station, comprising:

a receiver having an area of radio coverage and being configured to receive a first Collective Perception Message (CPM) from a first ITS station at a first position within the coverage area, the first CPM including first sensor data on an object perceived by the first ITS station:

an aggregator connected to the receiver and configured to aggregate said first sensor data with at least one second sensor data on the same object into a third sensor data, which second sensor data either is received via the receiver in a second CPM from a second ITS station at a second position within the coverage area perceiving the same object or is determined by a sensor of the ITS service station perceiving the same object; and a transmitter connected to the aggregator and configured to broadcast said third sensor data in a third CPM;

wherein the aggregator has a memory for storing first and second CPMs including timestamps of the sensor data therein and is configured to retrieve, for aggregating said third CPM, all sensor data from the memory having timestamps falling within a selected period of time.

10. An Intelligent Transportation System (ITS) service station, comprising:

a receiver having an area of radio coverage and being configured to receive a first Collective Perception Message (CPM) from a first ITS station at a first position within the coverage area, the first CPM including first sensor data on an object perceived by the first ITS station:

an aggregator connected to the receiver and configured to aggregate said first sensor data with at least one second sensor data on the same object into a third sensor data, which second sensor data either is received via the receiver in a second CPM from a second ITS station at a second position within the coverage area perceiving the same object or is determined by a sensor of the ITS service station perceiving the same object; and a transmitter connected to the aggregator and configured to broadcast said third sensor data in a third CPM;

wherein the third CPM is flagged with a higher priority than the first and second CPMs.

11. The ITS service station according to claim 5, wherein the ITS service station is a roadside unit.

12. The ITS service station according to claim 5, wherein the first sensor data includes a first data value and a first confidence measure of said first data value and the at least one second sensor data includes a second data value and a second confidence measure of said second data value, wherein the aggregator is configured to calculate a third data value from said first and at least one second data values and a third confidence measure from said first and at least one second confidence measures and to include said third data value and third confidence measure in the third sensor data.

13. The ITS service station according to claim 6, wherein the first sensor data includes a first data value and a first confidence measure of said first data value and the at least one second sensor data includes a second data value and a second confidence measure of said second data value, wherein the aggregator is configured to calculate a third data value from said first and at least one second data values and a third confidence measure from said first and at least one second confidence measures and to include said third data value and third confidence measure in the third sensor data.

14. The ITS service station according to claim 6, wherein the ITS service station is a roadside unit.

15. The ITS service station according to claim 7, wherein the first sensor data includes a first data value and a first confidence measure of said first data value and the at least one second sensor data includes a second data value and a second confidence measure of said second data value, wherein the aggregator is configured to calculate a third data value from said first and at least one second data values and a third confidence measure from said first and at least one second confidence measures and to include said third data value and third confidence measure in the third sensor data.

16. The ITS service station according to claim 7, wherein the ITS service station is a roadside unit.

17. The ITS service station according to claim 9, wherein the first sensor data includes a first data value and a first confidence measure of said first data value and the at least one second sensor data includes a second data value and a second confidence measure of said second data value, wherein the aggregator is configured to calculate a third data value from said first and at least one second data values and a third confidence measure from said first and at least one second confidence measures and to include said third data value and third confidence measure in the third sensor data.

18. The ITS service station according to claim 9, wherein the ITS service station is a roadside unit.

19. The ITS service station according to claim 10, wherein the first sensor data includes a first data value and a first confidence measure of said first data value and the at least one second sensor data includes a second data value and a second confidence measure of said second data value, wherein the aggregator is configured to calculate a third data value from said first and at least one second data values and a third confidence measure from said first and at least one second confidence measures and to include said third data value and third confidence measure in the third sensor data.

20. The ITS service station according to claim 10, wherein the ITS service station is a roadside unit.

\* \* \* \* \*